July 3, 1934.  V. PANTENBURG  1,965,509
METHOD OF FORMING SMALL PARTICLE PRODUCTS FROM GELATINIZING SUBSTANCES
Filed May 12, 1932
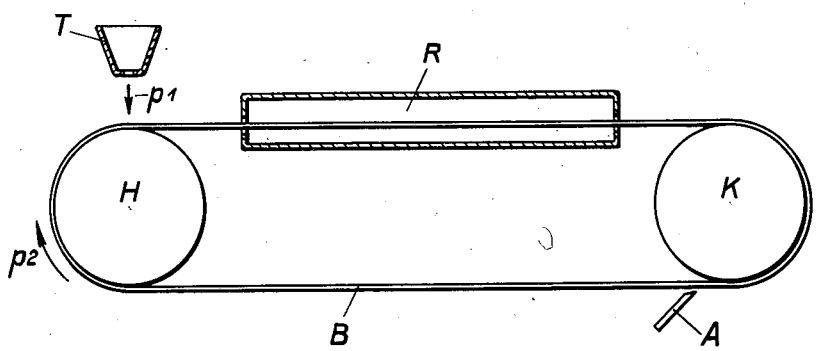
INVENTOR
Vitalis Pantenburg
BY Sturtevant Mason & Porter
ATTORNEYS Patented July 3, 1934

1,965,509

UNITED STATES PATENT OFFICE 1,965,509

METHOD OF FORMING SMALL PARTICLE PRODUCTS FROM GELATINIZING SUBSTANCES

Vitalis Pantenburg, Dusseldorf-Oberkassel, Germany, assignor to the firm Aktiengesellschaft fur chemische Produkte vormals H. Scheidemandel, Berlin, Germany Application May 12, 1932, Serial No. 610,969
In Germany January 27, 1928

2 Claims. (Cl. 18—57)

It is known to produce gelatinizing substances in the form of small particle form by passing the substances in fluid solution in the form of ribbons, strands or drops on travelling surfaces or in the form of drops into liquids where they are solidified by cooling.

In carrying out these processes the sequence of the various stages until the finished product is obtained, up to now, is that the solution is first gelatinized and then freed from water, that is to say, dried; the shaping or moulding takes place partly before and partly after the substance has been gelatinized but before the water has been extracted.

From the nature of this process it follows that the degree to which the solutions can be concentrated before the gelatinization, is restricted by the fact that the solutions must always remain liquid or even apt for dropping, so that a large portion of the water can only be removed after the gelatinizing and therefore temperatures can only be employed for effecting this removal which lie below the melting point of the substance under treatment, and which are therefore relatively low.

Contrary to the processes described above it has been found that it is possible to bring gelatinizing substances into uniform small-particle form by dropping their solutions on to travelling surfaces and there heating them to such a degree that they give up a part of their water content, but only so much and so slowly that they substantially retain the form given them when brought upon the conveyor surface.

It has also been found that the same effect can be obtained if the solution of the gelatinizing substance is allowed to flow onto the travelling surface in strands or in the form of a ribbon provided, care is taken that on the one hand, in distributing the solution on the conveyor surface, that the proportions are such that the surface of the solution brought upon this travelling surface is large in proportion to its mass, and, on the other hand, that certain limits of temperature are observed in heating the solution.

The upper and lower limits of the heating temperature are restricted as follows:—

The lower limit of heating is governed by the fact that in order to produce a relatively quick dehydration, it is necessary to prevent the substance under treatment being completely gelatinized. This limit therefore depends upon the ability of the substance under treatment to be gelatinized, which is governed by the type, quality and concentration of the substance.

The upper limit of temperature is governed by the object of the process, which is to obtain the substance in uniform small-particle form. If the temperature of heating is raised above a certain amount, which differs for each particular substance, the dehydration process is too rapid and causes too strong a development of steam; the substance dries in the form of a crumbly foam or disintegrates to a powder and thus no longer yields the uniform small-particle form aimed at by the present invention.

If the process is carried out along the lines described above, the result is obtained that the outer layer of the solution brought onto the conveyor surface gives up its water rapidly, and therefore becomes less fluid than the interior thereof and holds the latter in shape.

The period of time during which the solution is kept upon the travelling surface depends upon the extent to which the dehydration is required to proceed on the conveyor surface.

Technically it is possible to allow the dehydration to proceed on the heated travelling surface up to the degree of drying usual in the industry. In this case, the conveyor surface could for instance, have the form of a roller, band or rotary table.

In most cases however, this would require too long a period of time and therefore too long a conveyor surface, and in these cases the dehydration will only be carried out on the conveyor surface up to the degree from which it may be completed more economically in another manner.

When this degree of dehydration has been attained on the conveyor surface, the material under treatment has an outer pellicle, which is low in water and therefore relatively solid, and a hot fluid interior.

To enable the substance to be removed from the travelling surface, it must first be changed into solid form by being thoroughly gelatinized and for this purpose it is cooled on the conveyor surface. The cooling temperature for each individual substance must therefore lie under its gelatizing temperature. The farther it is below the latter the more rapidly does the gelatinizing take place and the shorter therefore can be the length of the conveyor surface.

In this case the sequence of heating and cooling by means of a roller or rotary table could only be carried out in a very complicated manner; it is much more simple to use a band as the travelling surface.

When the gelatinizing has been completed the substance can be removed in the known manner by scraper knives and carried away to be finally dried in any known manner.

If the solution has been brought on to the conveyor band not in drops but as ribbon or in strands, the ribbon or strands would break or tear when removed in uneven pieces. If it is desired to obtain uniform pieces, a known cutting device must be provided after the scraping off mechanism.

In all the above cases the fact that dehydration is effected on the travelling surface, that is, before the complete gelatization, offers the advantage against effecting the dehydration after the gelatinization that substantially higher temperatures can be employed for this purpose before the gelatinization than when the already gelatinized substance has to be dehydrated. This considerably accelerates the dehydration and is much more economical. Moreover any final drying which may be necessary can be effected more simply than heretofore because the substance arrives at this final drying stage with a far smaller water content than up to now and therefore a number of precautionary measures which were formerly necessary now become unnecessary.

In the above case the heating of the substance under treatment on the conveyor band, which takes place in the process described above, can be effected either by making the band of a substance which is a good conductor of heat and causing it to pass over a drum kept hot in known manner, or by passing a band of any type through a chamber heated in known manner. These two methods of heating can also be combined together.

The cooling can also be carried out in a similar manner.

In selecting the substance of which the travelling surface is made, apart from any consideration of the heat conductivity of the substance in the case described, attention must also be given to the fact that the substance under treatment thereon must be capable of being easily removed at the end of the process, that is, it must not adhere thereto. Two other means can also be employed for effecting this removal.

On the one hand, the band may be made of a material whose coefficient of heat expansion is substantially greater than that of the substance treated thereon so that when both are cooled for the purpose to completely gelatinize the substances the band contracts to a greater degree and therefore loosens from the substance carried thereon. An example of such a material having a high coefficient of heat expansion is unstainable Krupp steel.

On the other hand, the band may be made so thin that after the substance treated thereon has become completely gelatinized, the band can be bent over rollers having a very small radius of curvature. When the band is running over the rollers, the curvature loosens the substance carried on the band. For this purpose the band can also be bent successively in opposite directions.

An example of apparatus suitable for carrying out the process described above employing the dropping method is illustrated in the accompanying drawing.

T is a dropping trough having holes in its bottom through which the solution drops in the direction of the arrow $p_1$. It falls on to the metal band B which moves in the direction of the arrow $p_2$ and runs over the hot roller H which is heated in known manner, then through the hot chamber R, and finally over the cold roller K. The hot chamber R can be heated by electric or steam heaters disposed therein or by hot air passed therethrough either in one or in several stages.

The band issuing from the hot chamber R runs over the cold roller K which is cooled for instance by water flowing therethrough, so that the drops are here completely gelatinized and can then be removed by the scraper A for being brought to any final drying device.

I claim,

1. The method of forming solid globules or drops of substantially uniform size and shape from solutions of gelatinizing substances, which comprises placing individual drops of the solution upon a traveling surface at separated points thereof, maintaining the drops on the surface at a temperature above the gelatinization point of the drops and below the point of active development of steam whereby to effect a rapid dehydration of the drops without substantial change of the shape thereof, cooling the drops to below the gelatinizing temperature, and then removing the drops from the surface.

2. The method of forming solid globules or drops of substantially uniform size and shape from solutions of gelatinizing substances, which comprises placing individual drops of the solution upon a traveling surface at separated points thereof, maintaining the drops on the surface at a temperature above the gelatinization of the drops and below the point of active development of steam whereby to effect a rapid partial dehydration of the drops without substantial change of the shape thereof, interrupting the heating of the drops prior to complete dehydration, and rapidly cooling the drops to below the gelatinizing temperature for provoking a solidification, and then collecting the drops.

VITALIS PANTENBURG.